United States Patent
Reinauer et al.

(10) Patent No.: US 7,181,457 B2
(45) Date of Patent: Feb. 20, 2007

(54) SYSTEM AND METHOD FOR UTILIZING COMPRESSION IN DATABASE CACHES TO FACILITATE ACCESS TO DATABASE INFORMATION

(75) Inventors: Rob Reinauer, Austin, TX (US); Ken White, Cedar Park, TX (US); Chunsheng Sun, Round Rock, TX (US); Richard Arnold, Austin, TX (US); Sunil Jacob, Austin, TX (US); Desmond Tan, Cedar Park, TX (US); Kevin Lewis, Austin, TX (US)

(73) Assignee: Pervasive Software, Inc., Austin, TX (US)

( * ) Notice: Subject to any disclaimer, the term of this patent is extended or adjusted under 35 U.S.C. 154(b) by 411 days.

(21) Appl. No.: 10/447,205

(22) Filed: May 28, 2003

(65) Prior Publication Data

US 2005/0015374 A1    Jan. 20, 2005

(51) Int. Cl.
*G06F 7/00* (2006.01)
*G06F 17/30* (2006.01)
*G06F 17/00* (2006.01)

(52) U.S. Cl. .................. 707/10; 707/10; 707/101; 709/213; 711/159; 711/205; 711/207

(58) Field of Classification Search .................. 707/10, 707/101; 711/159, 205, 207; 709/213
See application file for complete search history.

(56) References Cited

U.S. PATENT DOCUMENTS

| | | | |
|---|---|---|---|
| 5,794,228 A | 8/1998 | French et al. | 707/2 |
| 5,875,454 A | 2/1999 | Craft et al. | 711/113 |
| 6,115,787 A | 9/2000 | Obara | 711/113 |
| 6,324,621 B2 | 11/2001 | Singh et al. | 711/129 |
| 6,879,266 B1 * | 4/2005 | Dye et al. | 341/51 |
| 7,054,912 B2 * | 5/2006 | Kanai et al. | 709/213 |
| 2002/0169784 A1 | 11/2002 | Cha et al. | 707/102 |

OTHER PUBLICATIONS

Wilson, Paul R. et al.; "The Case for Compressed Caching in Virtual Memory Systems" USENIX (1999), pp. 1-16.
Wang, Jenllong and Quong, Russell W.; "The Feasibility of Using Compression to Increase Memory System Performance," Presented at the International Workshop on Modeling, Analysis and Simulation of Computer and Telecommunications Systems (MASCOTS), Jan. 1994, pp. 1-7.

(Continued)

*Primary Examiner*—Tim Vo
*Assistant Examiner*—Cheyne D. Ly
(74) *Attorney, Agent, or Firm*—O'Keefe, Egan, Peterman & Enders, LLP

(57) ABSTRACT

A system and method are disclosed for utilizing compression in database caches to facilitate access to database information. In contrast with applying compression to the database that is stored on disk, the present invention achieves performance advantages by using compression within the main memory database cache used by a database management system to manage data transfers to and from a physical database file stored on a storage system or stored on a networked attached device or node. The disclosed system and method thereby provide a significant technical advantage by increasing the effective database cache size. And this effective increase in database cache size can greatly enhance the operations-per-second capability of a database management system by reducing unnecessary disk or network accesses thereby reducing data access times.

17 Claims, 6 Drawing Sheets

OTHER PUBLICATIONS

"Compressed Caching—Linus Virtual Memory," Printed Apr. 4, 2003 (http:///linuxcompressed.sourceforge.net/); pp. 1-7.

Chen, Zhiyuan "Statement of Present and Future Research Interests," Printed Apr. 4, 2003 (http://www.cs.cornell.edu/zhychen/job/ascii-research-statement.txt); pp. 1-3.

Chen, Zhiyuan "Building Compressed Database Systems," A Dissertation Presented to the Faculty of the Graduate School of Cornell University in Partial Fulfillment of the Requirements for the Degree of Doctor of Philosophy; Aug. 2002, pp. 1-163.

Cockshott, W.P. et al., "Data Compression in Database Systems," *1998 IEEE*; pp. 981-989.

Graefe, Goetz and Shapiro, Leonard D., "Data Compression and Database Performance," *1991 IEEE*, pp. 22-27.

Wilson, Paul R. et al., "The Case for Compressed Caching in Virtual Memory Systems," 1999 (http://www.cs.utexas.edu/users/oops/), pp. 1-16.

Cate, Vincent and Gross, Thomas, "Combining the Concepts of Compression and Caching for a Two-Level Filesystem," *Computer Architecture News*, No. 2., pp. 200-211, Apr. 19, 1991.

French, Clark D., "Teaching an OLTP Database Kernel Advanced Datawarehousing Techniques," *1997 IEEE*, pp. 194-198.

Mcdonald, Ian, "Distributed, Configurable Memory Management in an Operating System supporting Quality of Service," *1999 IEEE*, pp. 191-196.

Yang, Jun et al., "Frequent Value Compression in Data Caches," *2000 IEEE*, pp. 258-265.

Lee, Jang-Soo et al., "Performance analysis of a selectively compressed memory system," Microprocessors and Microsystems 26 (2002), pp. 63-75.

* cited by examiner

SYSTEM AND METHOD FOR UTILIZING COMPRESSION IN DATABASE CACHES TO FACILITATE ACCESS TO DATABASE INFORMATION

TECHNICAL FIELD OF THE INVENTION

The present invention relates to the management of data and more particularly to database management, for example, in networked client-server environments.

BACKGROUND OF THE INVENTION

In prior systems, cache memory has been used to improve performance of central processing units (CPUs) in computer systems. This cache memory is typically small in size as compared to main memory and is used to hold a segment of main memory for use by the CPU in its operations. To the extent the CPU can use instructions in cache memory without having to pull new information from main memory, CPU performance is typically enhanced. For this reason, it is often desirable to increase the cache memory size. Limitations exist, however, that hinder the ability to add more physical memory. For example, many operating systems limit how much main memory and cache memory a system can physically access. To increase the effective size of CPU cache memory, therefore, prior solutions have proposed the use of cache compression within the cache memory.

With respect to database environments, a portion of the main memory for the computer system managing the database is often used by the database management application as a database cache for data being read from or written to the stored database file. The database cache provides a buffer between the access, create and modify instructions from the database users and the database file itself. In addition, the database cache can provide for improved access times to client systems to the extent that the database management application can satisfy queries to the database from the data currently sitting in the database cache. The database file is typically stored on some physical media, such as one or more hard disks. With respect to the storage of large database files, prior work has focused on using data compression algorithms to reduce the size of the database files stored on hard drives. In addition, because most existing database access protocols operate on uncompressed data, prior work has also focused on protocols and query methodology for directly accessing the compressed data where the database file is compressed on disk. However, with increases in the speed of CPUs outpacing the speed of disk access, this disk compression can provide only limited improvement due to the physical limitations related to accessing data from a physical disk.

SUMMARY OF THE INVENTION

The present invention provides a system and method for utilizing compression in database caches to facilitate access to database information. In contrast with applying compression to the database that is stored on disk, the present invention achieves performance advantages by using compression within the main memory database cache used by a database management system to manage data transfers to and from a physical database file stored on a storage system or stored on a networked attached device or node. As discussed herein, the present invention provides a significant technical advantage by increasing the effective database cache size. And this effective increase in database cache size can greatly enhance the operations-per-second capability of a database management system by reducing unnecessary disk or network accesses thereby reducing data access times.

In part, the present invention provides a solution that substantially eliminates or reduces disadvantages and problems associated with previously developed database cache management systems. More specifically, the present invention provides systems and methods for managing data in database caches. This system includes a first data storage location. This first data storage location typically comprises a disk or network resource. Additional data storage locations, typically in the form of local or cache memory, allow database management systems to more quickly access frequently used data from a database cache as opposed to disk. To increase the effective size of the database cache, data stored within the local memory may be compressed. This compression typically becomes desirable when decompressing compressed data from the database cache and supplying this data to the data user can occur more quickly than accessing the original data from disk. The database cache can include both data and instructions, and the data may be formatted into pages or other like data structures as known to those skilled in the art. Furthermore, these pages (data structures) may include one or more flags that indicate whether the page has been compressed.

Other embodiments may further optimize the present invention by utilizing a local uncompressed database cache and a local compressed database cache. In such an embodiment, data pages, such as the least recently used pages within the local database cache, move to the local compressed database cache when the local uncompressed database cache is full. This use of compressed and uncompressed database caches can enhance performance because the performance penalty for compression/decompression is typically significantly less than disk access costs even when the compression penalty is incurred multiple times. By utilizing an uncompressed cache for the pages most likely to be re-used, the system can trade the fewest number of compression efforts for the highest number of disk reads. In certain embodiments, the pages within the compressed database cache may, in fact, only be compressed if the page actually compresses when compressed and/or when the compressed database cache has become full. This procedure can be used to avoid unnecessary compression and decompression, thus effectively increasing system resources.

BRIEF DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention compresses data within a database cache in order to effectively increase the size of database cache. Increased processor speeds make this possible as the time required to compress and decompress data and/or instructions with increased processor speed is less than the time required to access the data from disk. Previously, the time spent to compress and decompress data and/or instructions exceeded the time required to access and retrieve data and/or instructions from disk. The present invention couples increased processor speeds with high performance compression algorithms as known to those skilled in the art, allowing data and/or instructions to be compressed and decompressed faster than the time required for disk access.

Figure 1:
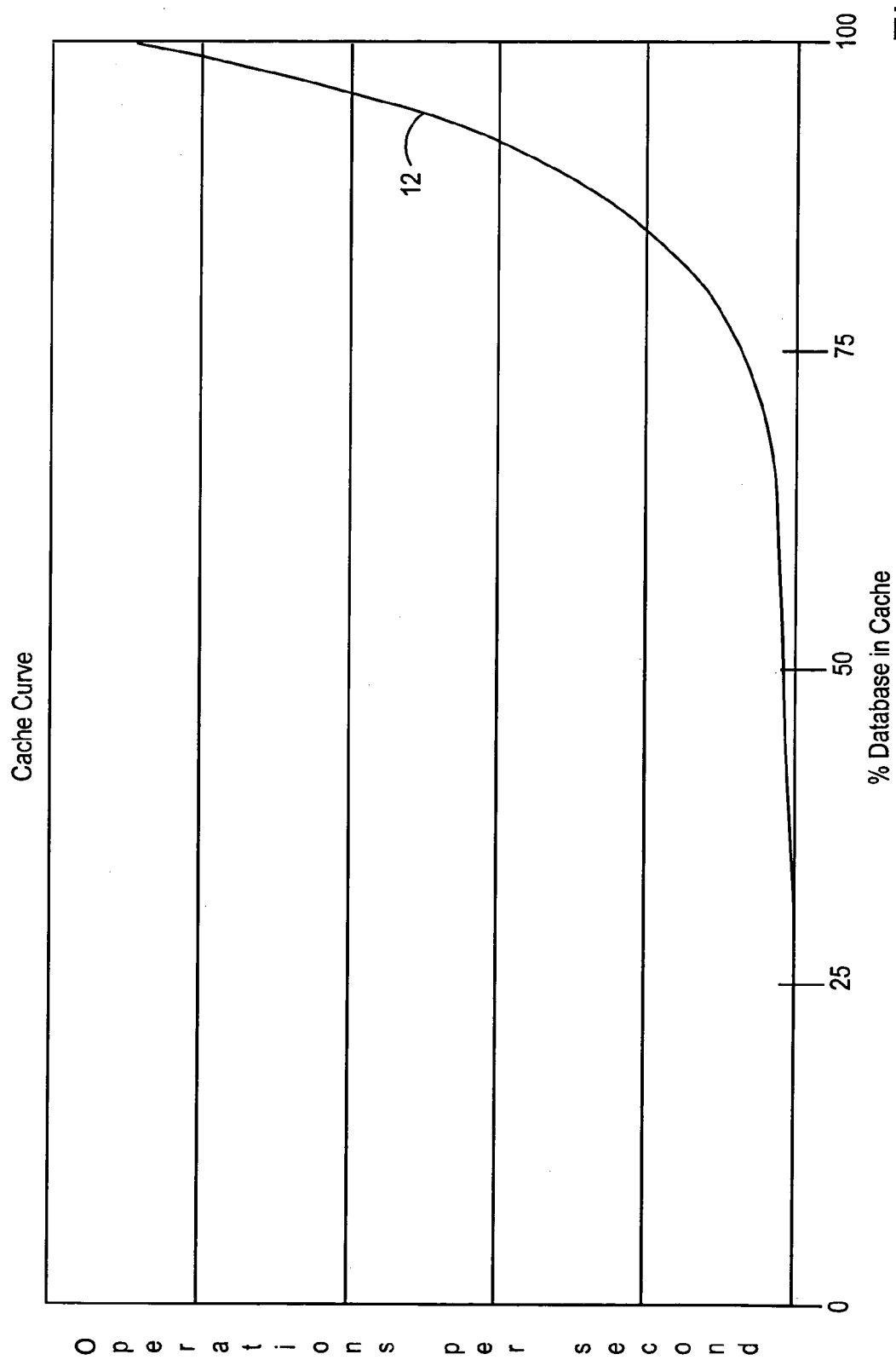
FIG. 1 graphically depicts the cache curve demonstrating the benefit of effectively increasing the size of database cache.

FIG. 1 graphically depicts the improved performance of a system based on a percentage of data caches, assuming a standard hard disk drive is used for persistent storage. Cache curve 12 shows that the benefit increases exponentially. This benefit increases exponentially as the number of operations per second on the y axis increase. Improved performance comes from the elimination of disk access times that may be associated with each operation. Cache curve 12 shows a change from 10 to 20 percent does not yield a large increase in the number of operations per second. However, an increase from 80 to 100 percent yields a much greater increase in operations per second. The Y-axis on FIG. 1 has been left without a scale because the actual numbers are dependent on a number of factors. These factors include the time to acquire a given piece of information from disk, the time to acquire the same piece of information from cache, and the time required to process that piece of information on behalf of the client (where this time is considered the same regardless of the source of the piece of information). Given these values, the Y-axis value for a given percentage of the total information in cache for a given time period can be calculated using the following formula, where "td" represents the time to acquire information from disk, "tm" represents the time to acquire information from memory, "tp" represents the time to process a given piece of information, and "tt" represents the total time taken to run the test:

$$Y=tt/((X^*tm)+((100-x)^*td)+tp)$$

Assuming current bard drive technology, which is multiple orders of magnitude slower than typical RAM access times and a reasonable "tp" value, as X increases, Y will increase exponentially. The reason for this relationship is the exponential disparity between "tm" and "td."

The method and system of the present invention add incremental costs to the access of cache through various processes. Primarily, compression, decompression and cache management all add incremental costs. These costs previously exceeded those associated with disk I/O access. However, increased processor speeds have greatly reduced these costs while disk I/O costs remain relatively unchanged.

Figure 2:
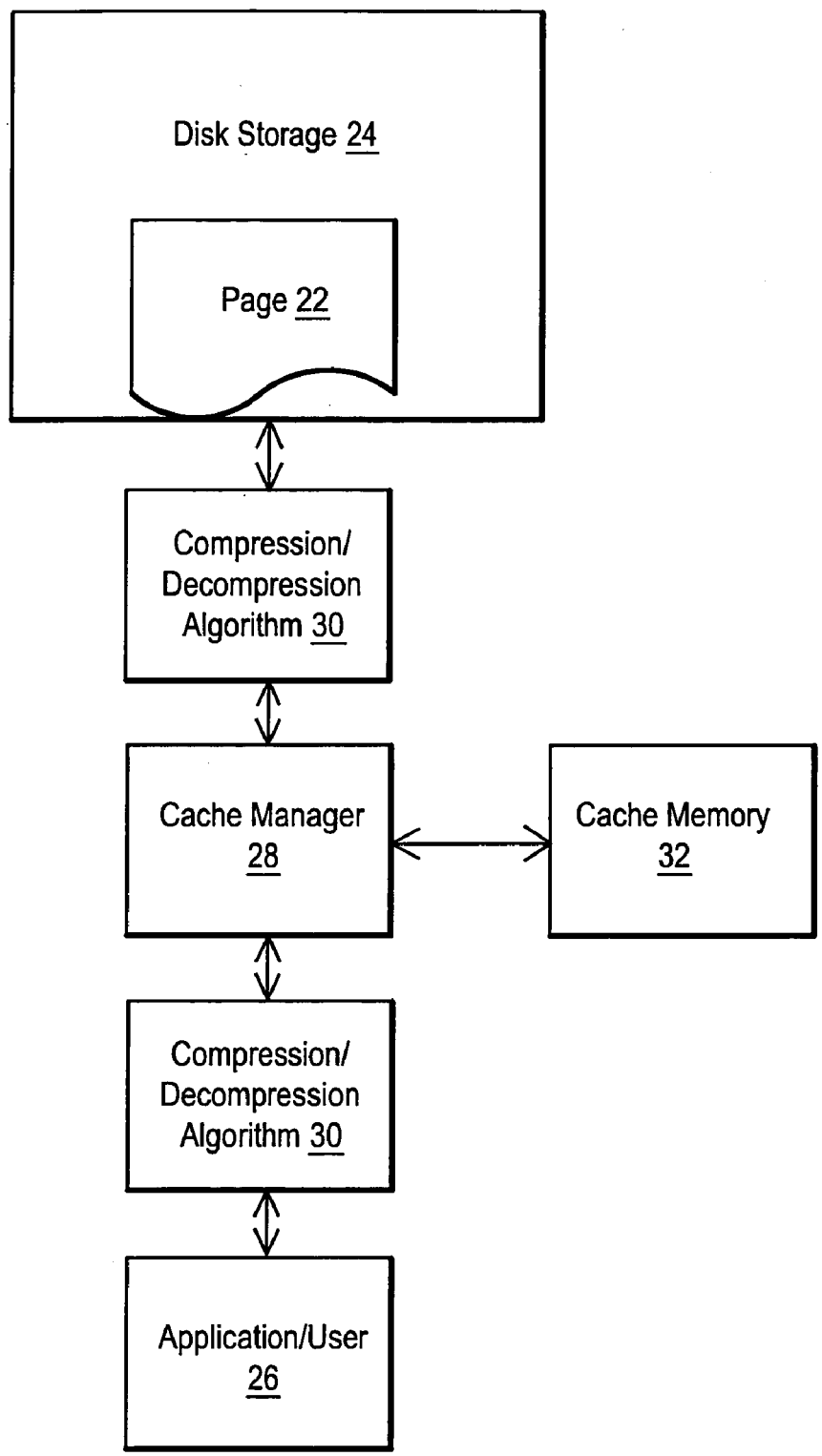
FIG. 2 depicts one general embodiment of the system and method provided by the present invention.

The present invention provides a system and method of effectively increasing database cache or local memory for database management systems. This greatly improves the performance of many database applications. FIG. 2 generally illustrates how the present invention handles data and/or instructions. This data and/or instructions are contained within pages. For example, when user 26 requests access to page 22, cache manager 28 causes page 22 to be accessed from disk 24. Compression/decompression algorithm 30 compresses page 22 within cache 32. Cache manager 28 directs compression/decompression algorithm 30 to decompress page 22 from cache 32, then page 22 is provided to user 26. Whenever page 22 is accessed by user 26, user 26 accesses page 22 from cache 32 and decompresses page 22 with a compression/decompression algorithm.

Figure 3:
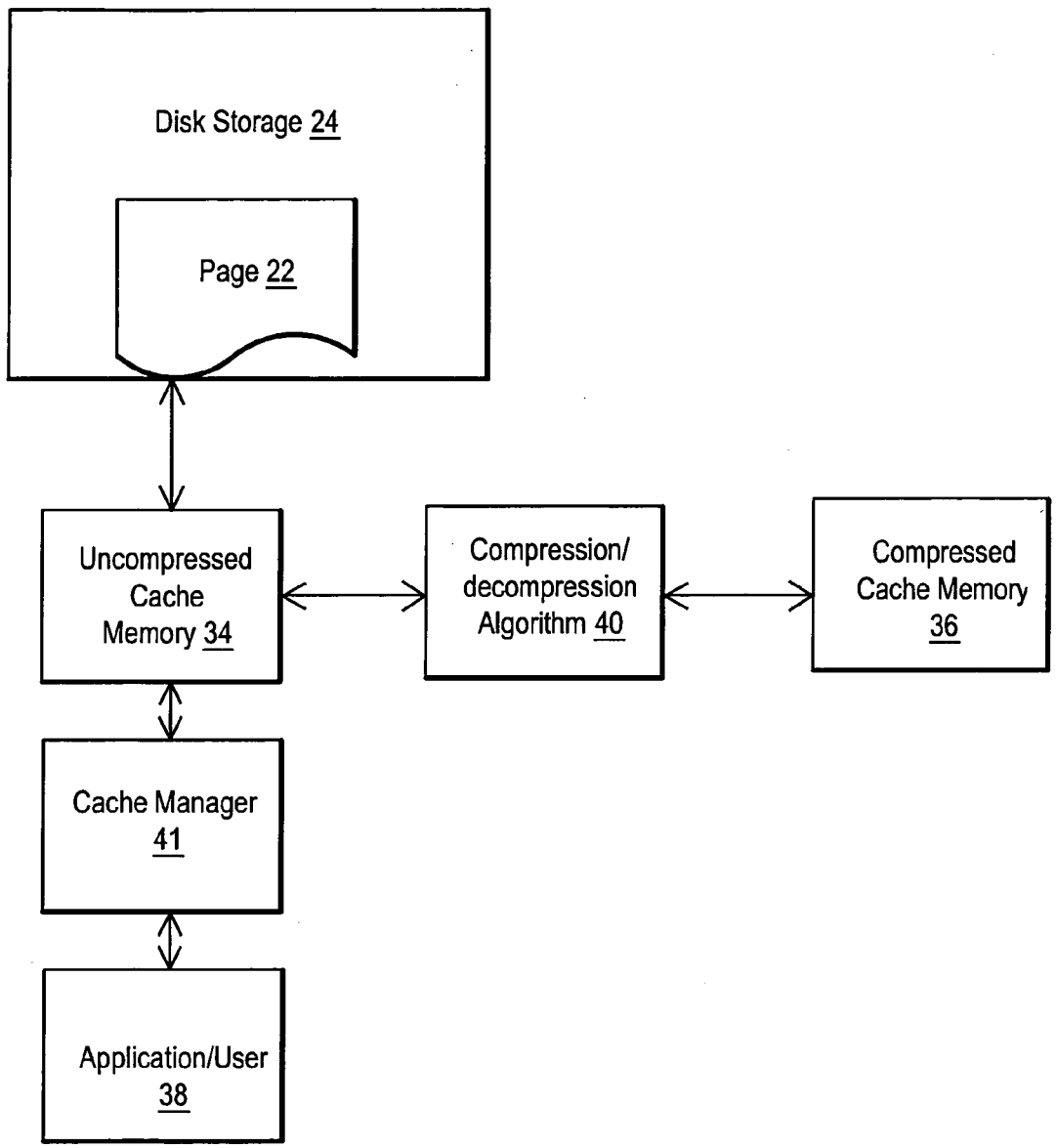
FIG. 3 illustrates an embodiment of the present invention that utilizes two cache memories.

If desired, as shown in FIG. 3, two or more database caches may be used by a database management system, according to the present invention. Here, page 22, when first accessed, resides within uncompressed cache 34. This embodiment uses two caches: uncompressed cache 34 and compressed cache 36. Users always read data and/or instructions from uncompressed cache 34. Hence, if page 22 has been compressed, the compression/decompression algorithm 40 decompresses page 22 and delivers the page to uncompressed cache 34. Compression/decompression algorithm 40 compresses the least recently used (LRU) pages from uncompressed cache 34 to compressed cache 36. These actions are directed by cache manager 41. Other cache management strategies may be utilized, if desired, including cache management strategies such as a least-recently-used cache management strategy in which relative "ages" of cache information is kept and the information that has remained unused for the longest time is replaced, a least-frequently-used cache management strategy in which the number of times information has been used over some number of uses or period of time and the information that is least used is replaced, and a first-in-first-out cache management strategy in which the first information added to the database cache is the first information to be replaced.

Figure 4:
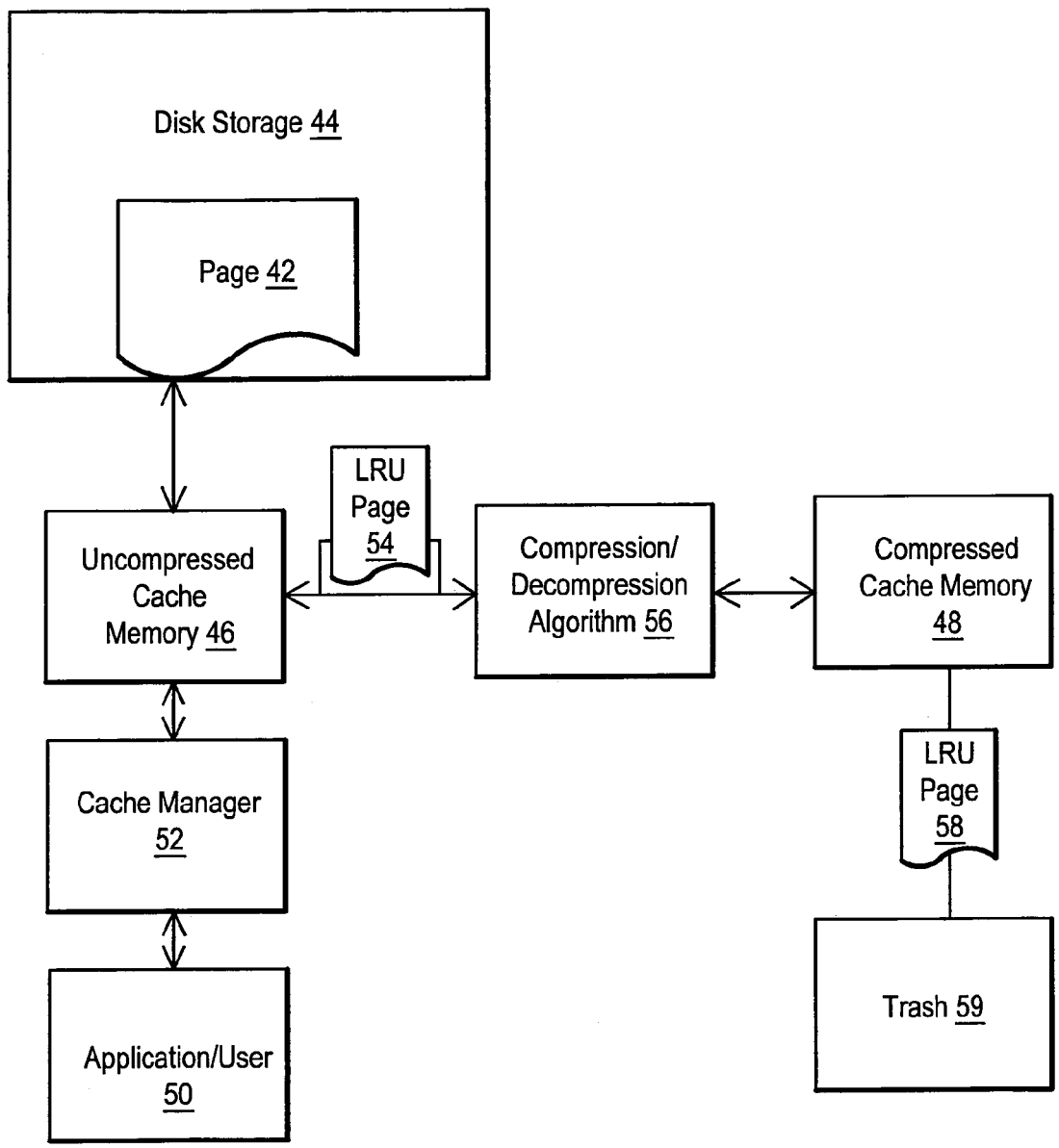
FIG. 4 illustrates other embodiments of the present invention utilizing two cache memories.

FIG. 4, similar to FIG. 3, again illustrates an embodiment of the present invention containing both an uncompressed cache 46 and a compressed cache 48. Here, page 42 initially resides on disk 44. When needed by user application 50, cache manager 52 directs that page 42 be retrieved from disk 44 and stored within uncompressed cache 46. Additional pages are stored in an uncompressed cache 46 until uncompressed cache 46 has been filled. As uncompressed cache 46 fills, cache manager 48 directs that the LRU page, page 54, stored within uncompressed cache 46, to be compressed via compression/decompression algorithm 56 and stored within compressed cache 48. LRU page 54 remains stored within compressed cache 48 until needed. When needed, compression/decompression algorithm 56 decompresses the page, which is then stored within uncompressed cache 46. When compressed cache 48 is full, cache manager 52 directs that the LRU page, page 58, within compressed cache 48 to be deleted or written over as represented by "trash" block 59. The decision to push the LRU pages from uncompressed cache 46 to compressed cache 48, and to delete the LRU from compressed cache 48 comes from the theory that users are more likely to access recently accessed pages. This theory avoids the costs associated with repeatedly compressing and uncompressing frequently used pages. Although the present invention uses an LRU cache management technique, any cache management technique known to those skilled in the art may be used in place of this technique. When a requested page has been deleted from compressed cache 48, that page must be read from disk 44.

The present invention also provides the ability to compress and uncompress asynchronously. Both compression and decompression provide cache management costs. Moving data and/or instructions from one cache to another involves up dating pointers within the cache manager. Furthermore, the compression and decompression require processor time. Compressing asynchronously queues uncompressed pages for compression when processor time becomes available. Asynchronous decompression similarly queues pages for decompression but requires predictive read ahead.

Operating systems often already use predictive read ahead when accessing files. This type of read ahead assumes the user will request the page following that being viewed. The drawback associated with predictive read ahead occurs when the user does not request what was predicted, thus requiring additional resources to be expended.

Another embodiment of the present invention addresses the problem with compressed pages that compress longer than the original page (i.e., the page actually expands). This problem occurs within all compression techniques. Compression does not guarantee to compress every page.

In some instances, the cache management technique may store pages that compress larger than their uncompressed size only within the uncompressed cache. This feature reduces or eliminates wasted memory but still consumes processing resources.

Cache compression enables cache to store more data pages within the cache. For example, if all data pages can be compressed to at least ½ their original size, with the size of the cache being constant, the cache can hold twice as many pages. Although having to compress/decompress pages adds overheads (i.e., CPU utilization), this increase in overhead is small when compared to disk I/O access costs.

There are a wide variety of different compression algorithms that can be used to compress data including data in a database cache. For example, a Limpel-Ziv (LZ) compression algorithm provide a technique that encodes a streaming byte sequence using a dynamic table. Popular variations on this technique include the LZ78 and LZ77 families. It is noted that other compression algorithms could be used, as desired. Preferably, a high performance compression/decompression algorithm is used so that the processing overhead for the algorithm does not outweigh the access time benefits provided by the compressed database cache approach of the present invention. In addition, any of a number of well-understood variants of the LZ algorithm may be utilized, as desired, depending upon the particular application, as would be understood by one of skill in the art.

To improve the compression/decompression algorithms performance, the algorithms may be modified with the following abilities. First, the algorithm does not compress the data page when the compression ratio is less than 2, and the page may be flagged to eliminate future attempts to compress the same page. Second, the algorithm writes out the compressed data in predetermined sizes such as 256 bytes (256 B). For example, if a 1K data page compresses to 356 B, the algorithm, when compressing, writes the first 256 B compressed data in one chunk and the remainder of the 100 B in another chunk. It is noted that at a trade-off exists with respect to the compression block size, and other compression block sizes may be utilized, as desired. In particular, it is noted that the smaller the compression block size, the better able the system typically is in taking advantage of reduced data size, but the more overhead the system will typically incur in managing the compressed blocks. Third, the algorithm provides a pointer to a compressed data header object that provides information about the compressed data pages.

Figure 5:
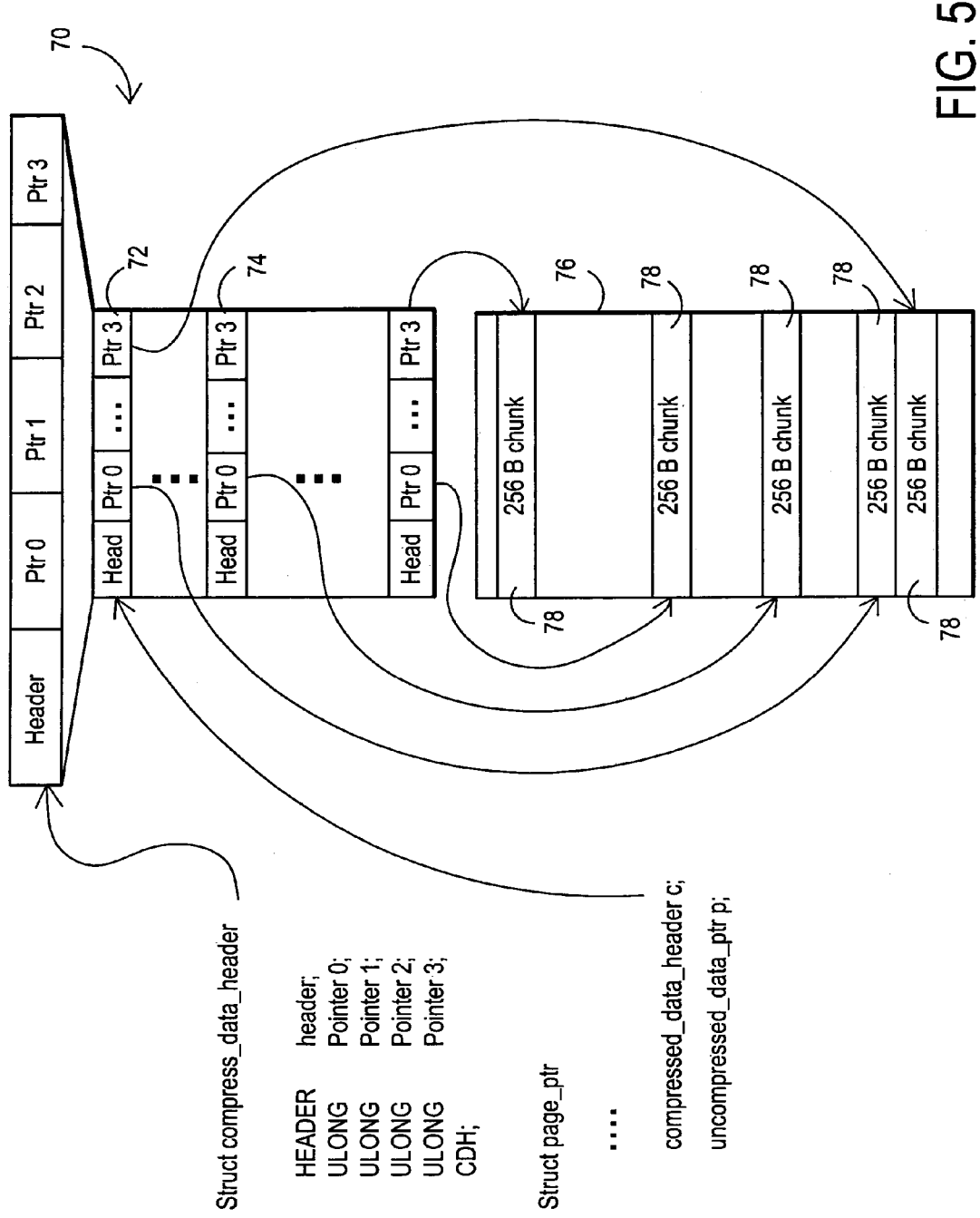
FIG. 5 depicts various structures within a block of compressed data.

FIG. 5 depicts the various structures that compressed data header object 70 tracks within the pieces of compressed data. As shown in this embodiment, the decompression algorithm gathers related chunks of 256B compressed data and decompresses them into their original size.

The integration of cache compression into an existing application may require modifying some structures within the existing application. The main part of the integration work occurs within the two caches. The structures identified begin with the page pointer (page_ptr) 72. Page pointer 72 may include an additional pointer 74 returned by the compression algorithm when the compression is successful. If pointer 74 is NULL, the data page is not compressed.

As mentioned above, the compressed cache receives a pool of memory 76. The different pools in the compressed cache include a pool of 256 B objects 78 that hold compressed data. Compressed data headers 70 serve as the map table or data pointer list for finding the different chunks of related compressed data. In the embodiment depicted, each header is limited to four 256 B objects. It is noted, however, that this size could be altered, as desired, without departing from the present invention. And in addition to being any fixed number of blocks, this header could also contain a structure containing a variable number of blocks, such as a vector or linked list.

Synchronous compression and decompression manipulates the data on request. When a thread moves a page from uncompressed cache to compressed cache, the thread invokes the compression function to compress the data page directly into the compressed cache pool of objects. Decompression occurs in the same manner. During decompression, first the correct size buffer is located in the uncompressed cache, after which pieces of related compressed data located in compressed cache decompress directly into the uncompressed cache. Compressing on demand requires no additional memory copying, reducing the amount of overhead. The disadvantage during heavy paging situations between uncompressed and compressed caches occurs when the data pages do not meet the required compression ratio. Failed compression (compressions thresholds in expansion) is an overhead in addition to the memory copy functions that needs to be invoked.

Asynchronous operation is typically best suited for compression. Data pages move from uncompressed cache to compressed cache, after which the compression function operates to compress the data. The advantage being that compression can happen any time. If heavy paging situations occurs, the overhead incurred is only the memory copy function. When less busy, a thread in the compressed cache can start the compression of the data pages queued for compression. This situation will typically invoke an additional memory copy function.

As noted above, compression and decompression adds a certain amount of overhead to the workings of an application. However, the idea trades this overhead for I/O by storing more data pages in cache. Not all database environments will experience a performance boost by having cache compression. Situations, which involve small size databases and CPU-bound systems, actually may experience a negative impact on performance with cache compression. Therefore, a setting for cache compression may be made available for the better-informed user within the application configuration or setup.

Returning to FIG. 4, in this and other embodiments of the present invention cache compression does not occur until all the available primary cache has been filled with uncompressed pages. This avoids compression and decompression until needed.

Compression of the secondary cache may begin when the system becomes I/O bound or may be considered the permanent state of the secondary cache. In this way, if an entire database fits into the total available cache without compression, the processor costs associated with compression and decompression are avoided automatically. This may also imply that an asynchronous thread might try to compress all non-compressed pages before freeing the LRU pages. It would do this in order based on a cache management algorithm, such as MRU/LRU.

In summary, the present invention provides a system and method that substantially eliminates or reduces disadvantages and problems associated with previously developed database management systems. This system includes a first data storage location. Where this first data storage location typically is a disk or network resource. Additional data storage locations, typically in the form of local or database cache, allow data users to more quickly access frequently used data from local or database cache as opposed to disk.

To increase the effective size of the database cache stored in memory, the present invention compresses data stored within the database cache. This compression only now becomes desirable as decompressing compressed data from the local memory and supplying decompressed compressed data to the data user can occur more quickly than accessing the original data from disk. Thus, the present invention further includes a processor and instructions operable to decompress the compressed data more quickly than the time required to access the information or data from non-local memory.

Figure 6:
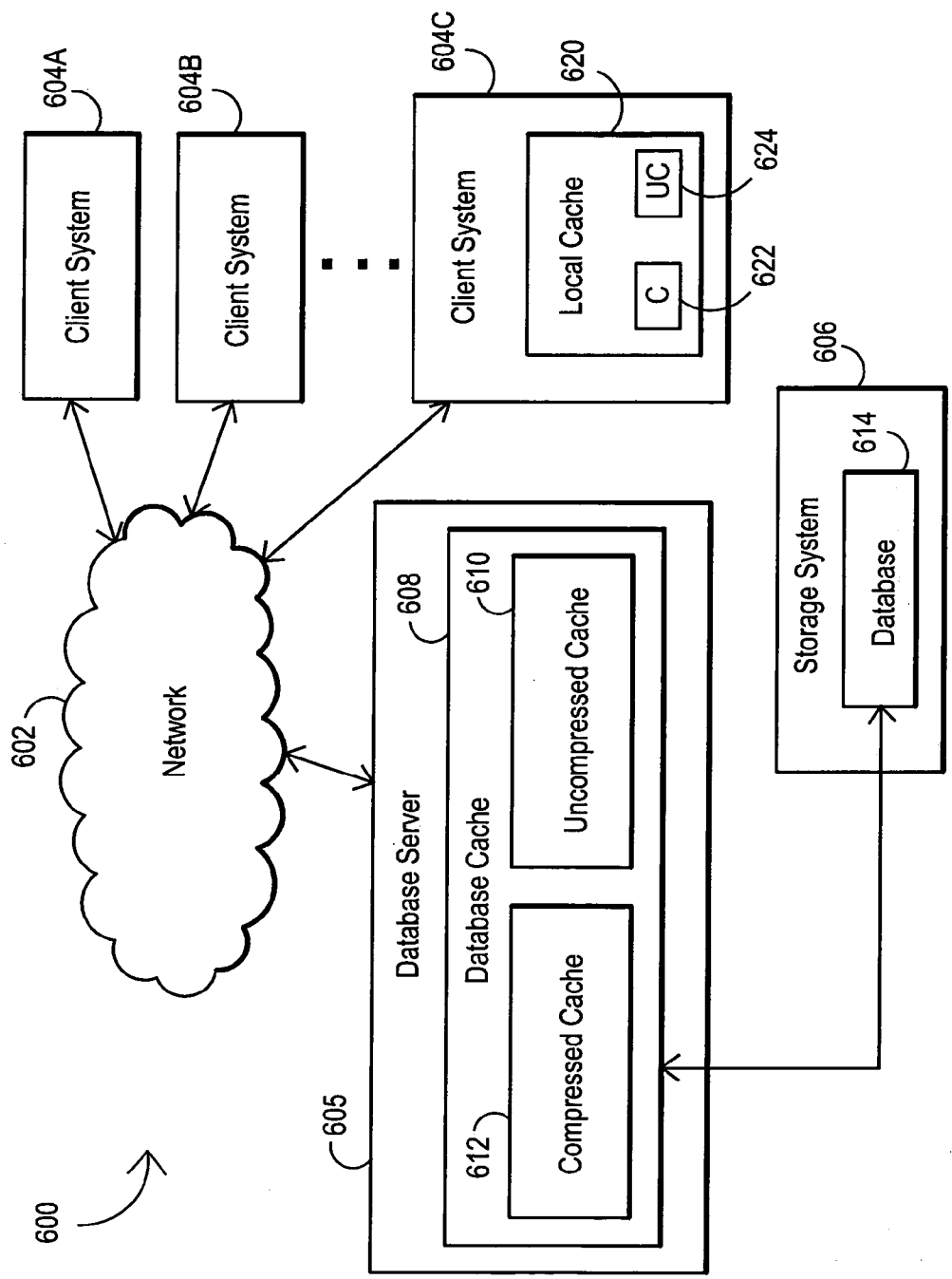
FIG. 6 is a block diagram for a client-server database environment in which a database server utilizes compression within its database cache.

FIG. 6 is a block diagram for a client-server database environment 600 in which a database server 605 utilizes compression within its database cache 608 to manage the database. In the embodiment depicted, one ore more client systems 604A, 604B . . . 604C are connected through network 602 to a server-based database management system 605. The database cache 608 provides an interface between the client systems 604A, 604B . . . 604C and the database 614 stored on the storage system 606. In its operations, the database management server 605 utilizes a database cache 608. As discussed above and according to the present invention, this database cache 608 includes a compressed cache 612 and an uncompressed cache 610. It is noted that in a client-server environment, the client systems 604A, 604B . . . 604C can also utilize a local database cache. For example, client system 604C could include a local database cache 620 that provides an interface between the database related operations of the client system 604C and the database server 605. As such, the client system 604C could cache database information locally in its local database cache 620 thereby reducing the number of accesses the client system 604C needs to make to database server 605 and also reducing latency caused by network access through network 602. In addition, the client system 604C could also utilized compression with respect to its local database cache 620, according to the present invention. As such, the local database cache 620 would include a compressed cache 622 and an uncompressed cache 624. With respect to the database cache 608 and the local database cache 620, if utilized, the ratio of compressed to uncompressed cache can be selected, as desired, and the entire database cache can be compressed if this implementation is desired. In addition, a fixed ratio or a dynamic ratio could be used, as desired. It is noted that where a local database cache is used in addition to the server database cache, coherence between these two caches can be problematic. Solutions to this cache coherence problem are discussed, for example, in U.S. patent application Ser. No. 10/144,917, filed May 14, 2002, and entitled "SYSTEM AND METHOD OF MAINTAINING FUNCTIONAL CLIENT SIDE DATA CACHE COHERENCE," the entire text and all contents of which are hereby expressly incorporated by reference in its entirety.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures for database processing. For example, equivalent elements may be substituted for those illustrated and described herein, and certain features of the invention may be utilized independently of the use of other features, all as would be apparent to one skilled in the art after having the benefit of this description of the invention.

What is claimed is:

1. A system for managing access to database information, comprising:

a first data storage device storing a database, the first data storage device comprising a storage device coupled to a server system;

a second data storage device storing a local database cache, wherein at least a portion of the local database cache comprises a compressed cache portion and an uncompressed cache portion where the uncompressed cache portion is less than the full local database cache, wherein the second data storage device comprises a local storage device coupled to a client system in a client-server environment, wherein the local database cache is utilized by the client system, and wherein the entire local database cache comprises compressed data and there is no uncompressed data; and a database management system controlling data transfers between the database stored by the first data storage device and the local database cache stored by the second data storage device and between the compressed portion of the local database cache and the uncompressed portion of the local database cache, if any, to manage accesses to database information by the client system, wherein the database management system comprises the client system.

2. The system of claim 1, wherein the first data storage device comprises a disk drive.

3. The system of claim 1, wherein the second data storage device comprises memory within a computer system.

4. The system of claim 3, wherein the memory is configured to store database cache information in pages.

5. The system of claim 4, wherein each database cache page stored within memory is configured to include a flag indicating whether or not the page comprises compressed data.

6. The system of claim 1, wherein the server system also has a database cache having a compressed portion and an uncompressed portion.

7. The system of claim 1, wherein a plurality of client systems are coupled to the server system in a client-server environment and wherein each client system has a local database cache having a compressed portion and an uncompressed portion.

8. A database management system for managing access to database information in a client-server environment comprising:
- a plurality of client systems, the client systems configured to access accessing information in a database;
- a server system coupled to the client systems through a network, the server system managing transfers of information between the client systems and the database;
- a first data storage device coupled to the server system and storing the database; and
- a local data storage device coupled to each client system and storing a local database cache, wherein the local database cache comprises a compressed cache portion and an uncompressed cache portion where the uncompressed cache portion is less than the full local database cache, and wherein the entire local database cache comprises compressed data and there is no uncompressed data;
- wherein the server system controls data transfers between the database and the local database caches for the client systems; and
- wherein each of the clients systems controls data transfers between the compressed portion of the local database cache and the uncompressed portion of the local database cache, if any, to manage accesses to database information by the client system.

9. The database management system of claim 8, wherein the first data storage device comprises a disk drive.

10. The database management system of claim 8, wherein the second data storage device comprises memory within a computer system.

11. The database management system of claim 8, wherein the server system is also configured to manage a database cache having a compressed portion and an uncompressed portion.

12. A method for managing access to database information, comprising:
- storing a database in a first data storage device, the first data storage device comprising a remote storage device coupled to a server system;
- storing a local database cache in a second data storage device, wherein the local database cache comprises a compressed cache portion and an uncompressed cache portion where the uncompressed cache portion is less than the full local database cache, wherein the second data storage device comprises a local storage device coupled to a client system in a client-server environment, and wherein the local database cache is utilized by the client system;
- storing the entire local database cache as compressed data such that there is no uncompressed data;
- controlling data transfers among the database and the local database caches for the client system; and
- controlling with the client system the compressed portion of the local database cache and the uncompressed portion of the local database cache, if any, to manage accesses to database information by the client system.

13. The method of claim 12, wherein the first data storage device comprises a disk drive.

14. The method of claim 12, wherein the second data storage device comprises memory within a computer system.

15. The method of claim 14, configuring the memory to store database cache information in pages.

16. The method of claim 15, further comprising utilizing for each stored database cache page a flag within the page to indicate whether or not the page comprises compressed data.

17. The method of claim 12, wherein, the server system also manages a database cache having a compressed portion and an uncompressed portion.

* * * * *